Aug. 18, 1953  A. BORRELLI  2,649,055
HANDLING APPARATUS FOR SPAGHETTI AND THE LIKE
Filed Aug. 13, 1951  3 Sheets-Sheet 1
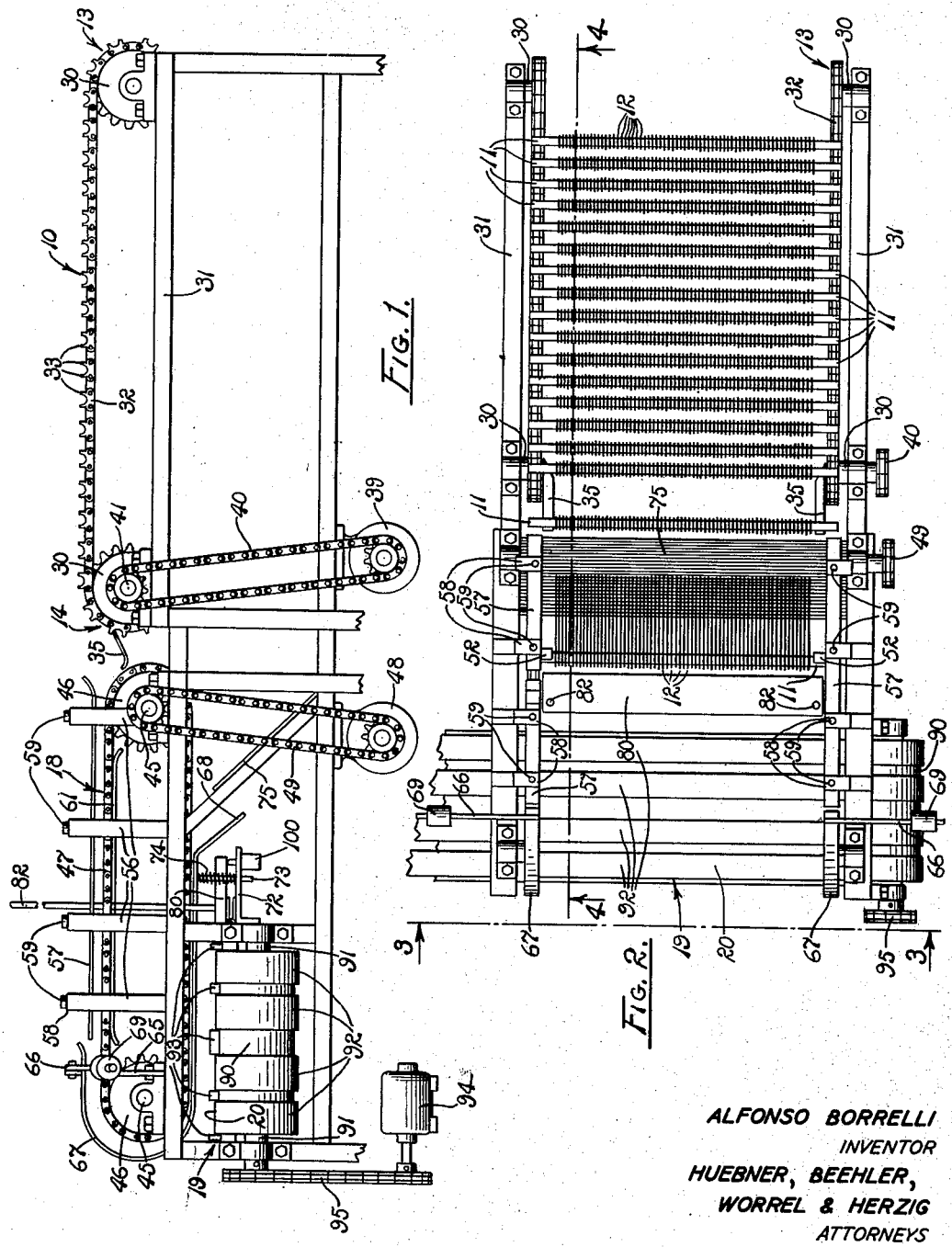
ALFONSO BORRELLI
INVENTOR
HUEBNER, BEEHLER,
WORREL & HERZIG
ATTORNEYS

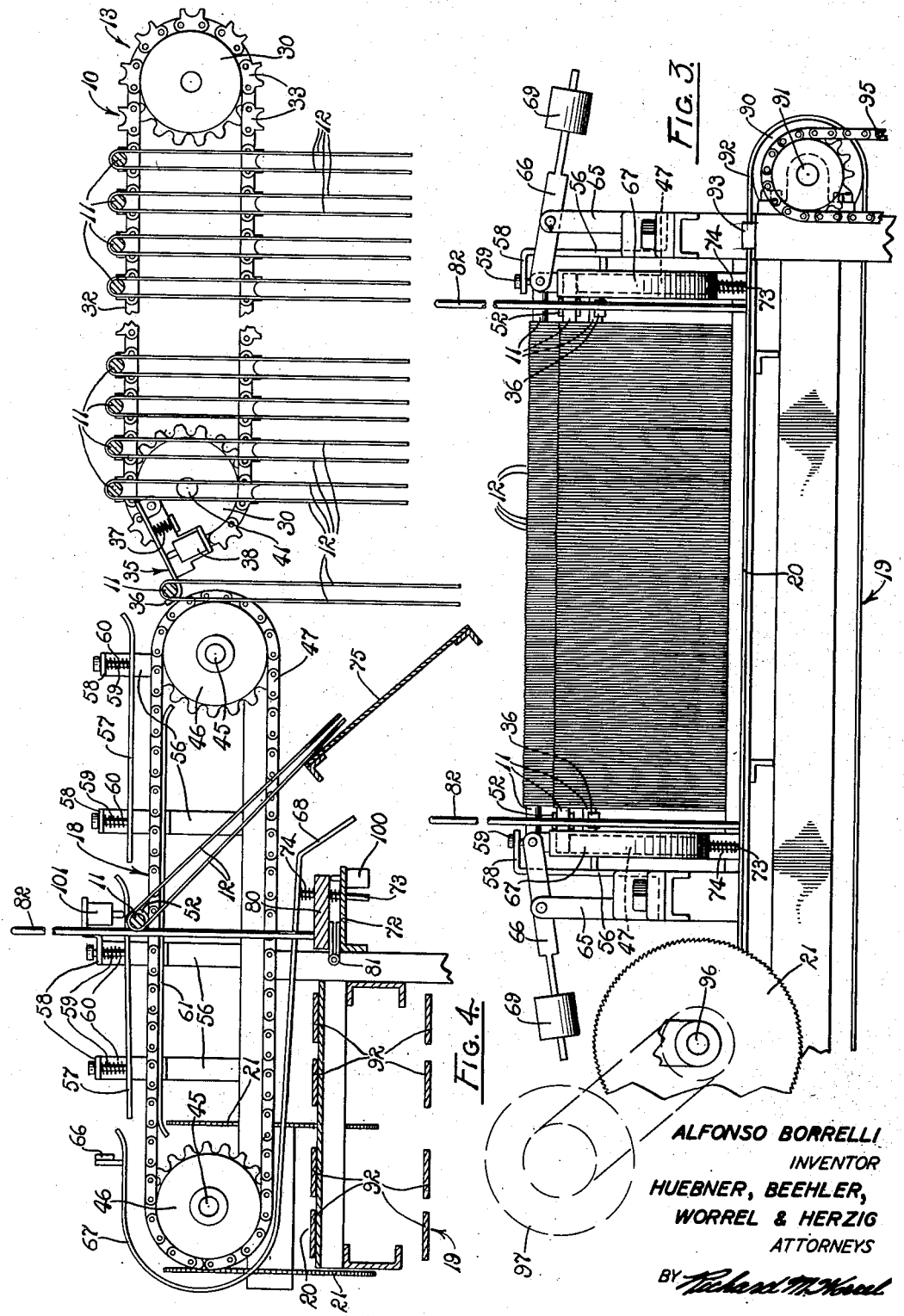

Aug. 18, 1953  A. BORRELLI  2,649,055
HANDLING APPARATUS FOR SPAGHETTI AND THE LIKE
Filed Aug. 13, 1951  3 Sheets-Sheet 3
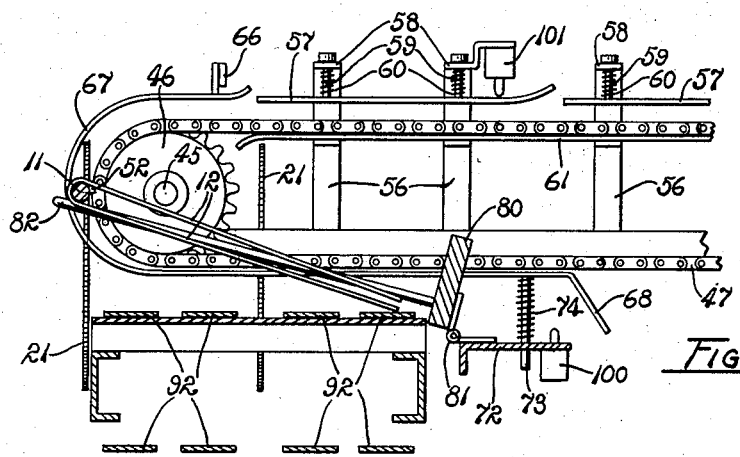
FIG. 5.
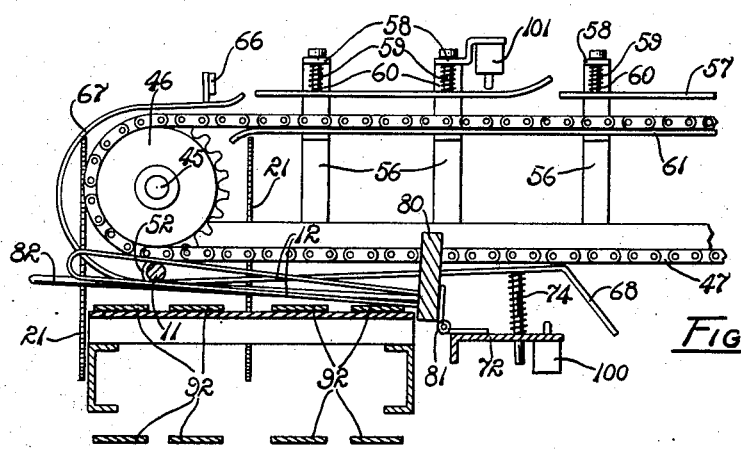
FIG. 6.
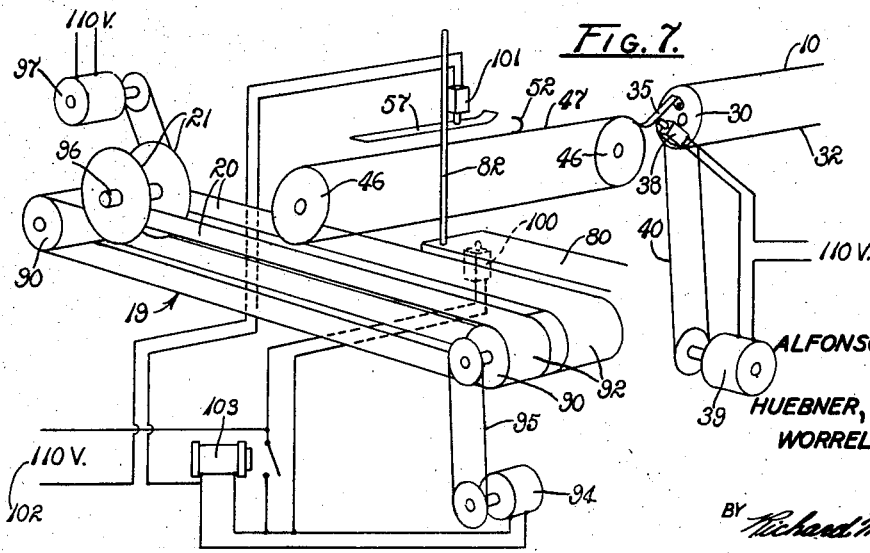
ALFONSO BORRELLI
INVENTOR
HUEBNER, BEEHLER,
WORREL & HERZIG
ATTORNEYS Patented Aug. 18, 1953

2,649,055

UNITED STATES PATENT OFFICE 2,649,055

HANDLING APPARATUS FOR SPAGHETTI AND THE LIKE

Alfonso Borrelli, Fresno, Calif.

Application August 13, 1951, Serial No. 241,586

10 Claims. (Cl. 107—7)

1

The present invention relates to material handling apparatus and more particularly to an apparatus adapted to receive strands of material such as spaghetti looped over support rods, to segregate the material and rods for independent discharge, and to cut the material into predetermined lengths.

Although the present invention resulted from the solution of certain problems encountered in the production of spaghetti and is most conveniently illustrated in that connection, the apparatus has many other applications where comparable problems are involved and it is to be understood that reference to the processing of spaghetti is for descriptive convenience and not to be interpreted as limiting the concept to the illustrative employment thereof.

It is the usual practice in the production of spaghetti and other paste food products to form the paste into desired stranded form and pendantly to support the strands on horizontal drying rods. The rods are usually releasably supported on hand trucks that are trundled into a dehydrator for the drying of the spaghetti.

Subsequent to the drying, the spaghetti is hard and brittle. The trucks carrying the spaghetti are subsequently transferred from the dehydrator to a packaging station at which the spaghetti is manually removed from the drying rods, carefully laid into elongated transversely slotted boxes, and sawed into predetermined lengths by shoving the slotted boxes across rotatably driven circular saws. Subsequent to the cutting of the spaghetti, the sections thereof are manually removed from the cutting boxes and placed into cartons for shipment to market.

The described process involved in the production of spaghetti is unsatisfactory in certain particulars. The requisite manual handling of the spaghetti is time consuming, unnecessarily expensive, productive of undesirable breakage, and unnecessarily slowly performed. Further, high standards of sanitation are more difficult to achieve where excessive handling is required.

An object of the present invention is to provide an improved apparatus for handling strands of material such as spaghetti looped over support rods which is adapted to segregate the material from the rods for independent discharge.

Another object is to provide an apparatus adapted to convey spaghetti and the like pendantly supported on rods, to segregate the spaghetti from the rods, and to cut the spaghetti into predetermined lengths.

Another object is to minimize the production costs for spaghetti and the like by the provision of improved apparatus for the automatic handling thereof.

Another object is to improve sanitation in the production of spaghetti and the like by minimizing manual operations conventionally required.

Another object is to minimize breakage in the handling and cutting of spaghetti and the like by the provision of an automatic machine suited to the purpose.

Further objects and advantages are to provide improved elements and arrangements thereof in a device of the character and for the purposes set forth that are fully effective in their operation, economical to produce, and operable with a minimum of adjustment, servicing, and other operator attention.

Still further objects and advantages will become apparent in the subsequent description in the specification.

Referring to the drawings:

Fig. 1 is a side elevation of an apparatus embodying principles of the present invention, portions of a support frame therefor being removed for illustrative convenience.

Fig. 2 is a fragmentary plan view of the apparatus showing a plurality of spaghetti drying rods pendantly supporting strands of dried spaghetti borne by a delivery conveyor thereof.

Fig. 3 is a somewhat enlarged end elevation of the structure shown in Fig. 2, as viewed from line 3—3 thereof.

Fig. 4 is a somewhat enlarged section taken on line 4—4 of Fig. 2.

Figs. 5 and 6 are somewhat enlarged fragments of portions of the apparatus shown in Fig. 4 illustrating successive operational positions of elements shown therein.

Fig. 7 is a schematic representation of the drive and control system of the subject apparatus.

Referring in greater detail to the drawings:

A delivery conveyor is indicated generally at 10 adapted to receive spaghetti supporting rods 11 in substantially horizontal position having strands 12 of spaghetti pendantly looped thereover. The delivery conveyor has a rod receiving end 13 and a delivery end 14.

A transfer conveyor 18 receives spaghetti supporting rods 11 from the delivery conveyor 10, in a manner soon to be described and carries the rods up over a feeding conveyor 19 for deposit of the strands of spaghetti 12 thereon.

The feeding conveyor 19 has an upper run 20 transversely positioned beneath an end of the transfer conveyor 18 and is laterally extended therefrom. A plurality of axially spaced saws 21 are rotatably driven in association with the extended end of the feeding conveyor to cut the strands 12 into predetermined lengths.

The delivery conveyor conveniently consists of two pairs of sprockets 30 mounted in horizontally spaced relation in any suitable frame structure 31. Corresponding sprockets of each pair are aligned and circumscribed by a chain 32. Alternate links of the chain mount outwardly extended cup-shaped brackets 32 adapted to receive the rods 11.

A pair of downwardly inclined arms 35 are pivotally mounted in the frame 31 at the delivery end 14 of the conveyor 10. The arms have upwardly curved lower ends 36 and are movable between an elevated empty position and a depressed loading position. Resilient springs or other means are provided below each of the arms to urge the arms into elevated positions. A normally closed switch 38 is mounted below one of the arms and connected electrically in series with a motor 39 having driving connection with a pair of the sprockets 30 by a drive chain 40. It will be observed that each pair of sprockets are mounted on a single shaft 41 so that motivation of the sprockets by the motor 39 imparts corresponding travel to the chains 32 with upper runs thereof moved toward the arms 35 which constitute a rest for spaghetti supporting rods 11 delivered thereto.

The transfer conveyor 18 consists of a pair of axles 45 journaled in the frame 31 in horizontally spaced relation parallel to the shafts 41. A pair of sprockets 46 are mounted on each of the axles with corresponding sprockets in alignment. Drag chains 47 circumscribe the corresponding sprockets. A motor 48 is connected in driving relation to one of the axles 45 by means of a drive chain 49 and serves correspondingly to motivate the drag chains with the upper runs thereof motivated away from the delivery conveyor. It will be observed that the drag chains are located in substantially erect parallel planes.

A pair of hooks 52 are mounted on the drag chains in substantial alignment transversely thereof and have a path of travel upwardly between the lower ends 36 of the arms 35 so as to lift rods 11 therefrom.

Bracket arms 56 are upwardly extended outwardly adjacent to the sprockets 46 and mount depressing tracks 57 thereon in vertical alignment with the upper runs of the drag chains. The bracket arms preferably provide inwardly turned upper ends 58 having openings formed therethrough. Headed pins 59 are slidably extended downwardly through the openings and serve to mount the depressing tracks 57 in elevationally spaced relation to the upper runs of the drag chains 47. Helical compression springs 60 are preferably mounted between the inturned upper ends of the bracket arms and the tracks to urge the tracks downwardly in vertically spaced relation to the upper runs a distance slightly less than the diameter of the rods 11. An elongated supporting member 61 is mounted in the frame 31 in supporting relation to the upper runs of each of the drag chains 47 to resist sagging thereof.

As seen in Fig. 3, fulcrum arms 65 are mounted on the frame 31 adjacent to the bracket arms 56 above the feeding conveyor 19. A lever 66 is pivotally mounted in the upwardly extended end of each of the fulcrum arms. An arcuate track 56 has an upper end pivotally supported on an extended end of each of the levers 66 and is curved about the adjacent end of its respective drag chain 47 and back under the lower run of said chain where it is directed downwardly from the chain, as at 68. Each of the levers 66 is provided with a weight 69 mounted on an end thereof in counter-balancing relation to the weight of the arcuate track supported on the opposite end.

A bracket 72 is provided in the frame 31 in a horizontal position below the ends 68 of the tracks 67 in parallel relation to the feeding conveyor 19. The lower end of each track is provided with a downwardly directed pin 73 slidably extended through the bracket 72 for floating support of the track. A compression spring 74 is provided between the lower end of each track and the bracket. It will be observed that each track is suspended for floating movement adjacent to its respective drag chain 47 and is urged into greater proximity thereto than the thickness of the rods 11. The arcuate tracks 67 are so formed that rods 11 conveyed by the hooks 52 are held in intimate engagement with the hooks by the arcuate tracks as they are carried to the end of the upper run of the transfer conveyor 18, around the end of the transfer conveyor over the feeding conveyor, and thence back under the lower run of the transfer conveyor. It will be obvious that when the rods 11 reach the ends of the arcuate track 67, they are no longer held in hook engagement and gravitationally descend.

As will soon become apparent, the transfer conveyor characterizes means for conveying rods 11 from the arms 35 transversely of the feeding conveyor 19 in elevationally spaced relation thereto, whereby the strands 12 of spaghetti are dragged across the feeding conveyor 19, and for returning the rods transversely of the feeding conveyor 19 in increased proximity thereto for removal of the rods from the spaghetti. As shown in Fig. 4, to facilitate the dragging of the strands 12 of the spaghetti into an inclined attitude, a drag plate 75 is mounted in the frame 31 below the receiving end of the transfer conveyor and in transverse relation thereto. The plate is inclined toward the opposite end of the transfer conveyor.

An aligning wall 80 is pivotally mounted on the bracket 72 in parallel relation to the feeding conveyor 19 for pivotal movement between a horizontal position directed away from the feeding conveyor, as shown in Fig. 4, and an upwardly extended position between the lower runs of the drag chains 47, as shown in Fig. 6. A butt hinge 81 is suitable for mounting the aligning wall on the bracket. The wall is preferably of appreciable thickness, conveniently taking the form of a 1 x 4 board. The wall is mounted on the hinge so that the thickness thereof is vertically extended when the wall is downwardly pivoted and interposed between the hinge and the feeding conveyor when the wall is upwardly pivoted. It will be apparent that not only does the pivotal movement serve to move the wall toward the feeding conveyor but that the thickness of the wall is also utilized to provide increased approach to the feeding conveyor incident to such pivotal movement. A control arm 82 is rigidly extended from the wall 80 for unitary pivotal movement therewith between a position extended upwardly between the upper runs of the drag chains 47 when the wall is in horizontal position, and a horizontally extended position transversely of the feeding conveyor when the wall is in upwardly extended position.

The feeding conveyor 19 includes a pair of cylindrical drums 90 journaled in horizontally spaced relation in the frame 31 on concentric mounting shafts 91. A plurality of spaced belts 92 are mounted in circumscribing relation on the drums. Guides 93 are upwardly extended from the frame 31 on opposite sides of the belts and serve to maintain the belts in substantially parallel, predetermined spaced relation. A motor 94 is mounted in the frame 31 adjacent to one of the shafts 91 and driving connection established between the motor and an adjacent shaft 91 as by a driving chain 95.

The saws 21 are mounted on a drive shaft 96 journaled in the frame transversely above the belts 92 in such spaced relation thereto that the saws pass between the belts. A motor 97 is provided in driving connection to the drive shaft 96 and serves continuously to rotate the saws to cut spaghetti carried thereto by belts 92.

A normally open starting switch 100 is mounted on the bracket 72 for engagement with the wall 80 when the wall is in horizontal position, as shown in Fig. 4. A normally closed stop switch 101 is mounted on one of the inturned upper ends 58 of the bracket arms 56 for engagement by one of the depressing tracks 57 when elevated by passage of a rod 11 thereunder. As indicated in Fig. 8, the stop switch 101 is electrically connected in series with a source of electrical energy 102 in series with the primary and secondary of a relay 103 so that the relay is self-sustaining. The primary of the relay is preferably connected electrically in parallel with the motor 94. The starting switch 100 connects the primary of the relay in series with the source of electrical energy 102 and in series with the stop switch 101. Thus, when the wall pivots to horizontal position, the starting switch 100 is closed energizing the relay 103 and completing the circuit through the motor 94. The switch 101 is normally closed and thus the relay 103 is self sustaining and the motor 94 continues to drive the feeding conveyor 19 until a rod 11 passes under the depressing track 57 below the stop switch 101, elevating the depressing track to open the switch and interrupt the circuit. By the time the rod passes the depressing track 57 operating the stop switch, the control arm 82 is carried by the rod into a downwardly pivoted position opening the starting switch 100. The relay 103 is subsequently energized and the motor 94 started by return of the wall to horizontal position in a manner soon described.

*Operation*

The operation of the apparatus of the present invention is believed to be clearly apparent and is briefly summarized at this point. Rods 11 pendantly supporting strands 12 of spaghetti or other material suitable for use in the apparatus, are manually positioned in the brackets 33. As the motor 39 drives the delivery conveyor 10 the rods are successively delivered to the arms 35 constituting a rest therefor. The delivery conveyor is preferably driven at such a speed that a single rod is delivered to the rest in approximately the time required for the hooks 52 to complete a circuit with the transfer conveyor 18. When a rod is delivered to the arms 35, they are depressed into loaded position, opening the switch 38 and interrupting operation of the motor 39.

The transfer conveyor 18 is continuously traveled during operation of the apparatus. Upon circuitous travel of the drag chains 47, the hooks 52 are moved upwardly over the rod 11 rested on the arms 35 and serve to drag the rod along the upper run of the transfer conveyor. During this operation, the wall 80 is in horizontal position and the motor 94 energized through the relay 103 to motivate the feeding conveyor 19.

The conveyance of a rod 11 along the upper run of the transfer conveyor 18 drags the strands 12 of spaghetti upwardly over the drag plate 75 facilitating their transitional movement from vertical pendant position into substantially horizontal position on the feeding conveyor. The depressing tracks 57 maintain the rod in dependable hook engagement during conveyance by the transfer conveyor.

As a rod 11 is carried along the upper run of the transfer conveyor 18, it passes under the depressing track 57 adjacent to the stop switch 101 and by elevation of the depressing track interrupts the circuit to the relay 103 and motor 94. This preferably occurs just subsequent to sufficient pivotal movement of the aligning wall 80 upwardly from horizontal position incident to engagement of the control arm 82 by such a rod, that the starting switch 100 is already opened. Interruption of the motor 94 stops the feeding conveyor 19 and preconditions it for receipt of the spaghetti.

Electrical circuits other than that described that are suited to the purpose will readily occur to those skilled in the art. For example, the stop switch 101 may be eliminated and a starting and stopping switch substituted at 100. Such modifications are considered to be within the scope of the present invention as long as the described synchronous operation is attained.

Continued travel of the drag chains 47 of the transfer conveyor causes the rod to pass around the end of the transfer conveyor and back under the lower run thereof, the rod being held in hooked engagement by the arcuate track 67.

As shown in Figs. 4, 5, and 6, the spaghetti is dragged across the temporarily stationary feeding conveyor 19 by movement of the rod transversely thereof and the wall 80 pivoted into a substantially upright position. As the hooks 52 return the rod transversely of the feeding conveyor in increased proximity thereto the rod is drawn from the looped strands 12 of the spaghetti. The wall strikes the ends of the spaghetti and precludes movement thereof from the feeding conveyor incident to continued travel of the rods therefrom. It will be evident that as a rod starts on its return travel across the feeding conveyor 19, the control arm 82 is pivoted to its lower most position and the aligning wall 80 completes its pivotal movement to upright position. The return movement of the rod plus the completion of the upward pivotal movement of the wall effectively aligns the ends of the spaghetti against the wall so that the trimming thereof is obviated.

As the rod 11 is moved from the ends of the spaghetti, it engages the wall 80 and pivots the wall to horizontal position shown in Fig. 4. The control arm 82 is responsively moved to upright position and preconditioned for a successive cycle of operation.

The movement of the wall 80 to horizontal position closes the starting switch 100 and energizes the relay 103 and motor 94 which continues to run and to travel the upper run of the feeding conveyor 19 toward the saws 21 until the stop switch 101 is again opened in the manner described.

A significant feature of the present invention is the described association of the transfer conveyor 18, aligning wall 80, feeding conveyor 19, and related structure which segregates the rods 11 from the strands 12 of spaghetti, discharges the rods from the lower end 68 of the arcuate tracks 67 and positions the strands transversely on the transfer conveyor with the ends thereof precisely aligned against the aligning wall. Movement of the belts 92 of the feeding conveyor carries the spaghetti into the saws 21 which sever the strands into lengths predetermined by axial spacing of the saws. Subsequent to cutting, the lengths of cut spaghetti continue on the upper run of the feeding conveyor 19 and are conveniently directed into packing cartons, not shown.

The apparatus of the present invention has substantially reduced the manual labor incident to the removal of spaghetti and the like from drying rods, the cutting of the spaghetti, and the packaging thereof for market. It not only minimizes labor expense but reduces breakage incident to hand operations and assures uniform lengths of cut spaghetti. It is fully automatic in its operation and all that attendants need do is provide an adequate supply of spaghetti supporting rods 11 on the delivery conveyor and an adequate movement of cartons at the end of the transfer conveyor to receive the cut spaghetti.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. In an apparatus for handling elongated substantially U-shaped strands of material looped over supporting rods and having downwardly extended ends, the combination of a substantially horizontal strand receiving member, means for individually carrying material supporting rods in substantially horizontal attitude across the receiving member in elevationally spaced adjacent substantially parallel relation thereto to drag the material supported by the rods across the member and for individually returning the rods across the member in increased proximity to the member, a wall pivotally mounted adjacent to the strand receiving member at the side thereof from which the rods are carried across the receiving member for movement between a substantially horizontal position extended away from the conveyor for the dragging of the strands thereacross and a substantially erect position for abutting the ends of the strands to hold said strands on the receiving member during return movement of the rods whereby the rods are separated from the strands, and a control arm mounted on the wall and upwardly extended therefrom into the elevated path of movement of the rods across the receiving member for engagement therewith to move the wall into substantially erect position and said arm into depressed position below the return path of movement of the rods, the wall in substantially erect position being disposed in the return path of movement of the rods for engagement therewith to move said wall into its substantially horizontal position and to return the arm to its upwardly extended position.

2. In an apparatus for handling elongated substantially U-shaped strands of material looped over supporting rods and having downwardly extended ends, the combination of an elongated conveyor, means for individually carrying material supporting rods in time spaced relation in substantially horizontal attitude disposed longitudinally of the conveyor transversely thereacross in elevationally spaced adjacent relation to the conveyor and returning the rods transversely across the conveyor in increased proximity thereto, a wall pivotally mounted adjacent to the conveyor at the side thereof from which the rods are carried across the conveyor for movement between a substantially horizontal position extended away from the conveyor for the dragging of the strands thereacross and a substantially erect position for abutting the ends of the strands to hold said strands on the conveyor during return movement of the rods whereby the rods are separated from the strands, and a control arm mounted on the wall and upwardly extended therefrom into the elevated path of movement of the rods across the conveyor for engagement therewith to move the wall into substantially erect position and said arm into depressed position below the return path of movement of the rods, the wall in substantially erect position being disposed in the return path of movement of the rods for engagement therewith to move said wall into its substantially horizontal position and to return the arm to its upwardly extended position.

3. In an apparatus adapted to receive spaghetti and the like pendantly looped over drying rods and to segregate the spaghetti and rods for independent delivery, the combination of an endless conveyor having a substantially horizontal upper run, a track mounted transversely adjacent to the upper run of the conveyor, means for individually carrying substantially horizontal drying rods transversely of the conveyor substantially longitudinally disposed to the conveyor in predetermined elevationally spaced relation to the conveyor with pendantly supported spaghetti dragged horizontally across the conveyor and for returning the rods transversely of the conveyor along the track in increased proximity to the conveyor, a wall pivotally mounted adjacent to the conveyor at the side thereof from which the rods are carried across the conveyor for movement between a substantially horizontal position extended away from the conveyor for the dragging of the spaghetti thereacross and a substantially erect position for abutting the pendant ends of the spaghetti to hold said spaghetti on the conveyor during return movement of the rods whereby the rods are separated from the spaghetti, and a control arm mounted on the wall and upwardly extended therefrom into the elevated path of movement of the rods across the conveyor for engagement therewith to move the wall into substantially erect position and said arm into depressed position below the return path of movement of the rods, the wall in substantially erect position being disposed in the return path of movement of the rods for engagement therewith to move said wall into its substantially horizontal position and to return the arm to its upwardly extended position.

4. In an apparatus adapted to receive spaghetti and the like pendantly looped over drying rods and to segregate the spaghetti and rods for independent delivery, the combination of an endless conveyor having a substantially horizontal upper run, a pair of tracks mounted transversely of the upper run of the conveyor in adjacent spaced relation thereto, means for individually carrying substantially horizontal drying rods transversely of the conveyor in time spaced relation in substantially horizontal attitude disposed longitudinally of the conveyor and in predetermined elevationally spaced relation to the conveyor with pendantly supported spaghetti dragged horizontally across the conveyor between the tracks and for returning the rods transversely of the conveyor along the tracks in increased proximity to the conveyor, an aligning wall pivotally mounted in parallel relation to the conveyor between the tracks at the side of the conveyor from which drying rods are initially carried across the conveyor for movement between a substantially horizontal position extended away from the conveyor for the dragging of the spaghetti thereacross and a substantially erect position for abutting the pendant ends of the spaghetti to hold said spaghetti on the conveyor during return movement of the rods whereby the rods are separated from the spaghetti, and a control arm mounted on the wall and upwardly extended therefrom into the elevated path of movement of the rods across the conveyor for engagement therewith to move the wall into substantially erect position and said arm into depressed position below the return path of movement of the rods, the wall in substantially erect position being disposed in the return path of movement of the rods for engagement therewith to move said wall into its substantially horizontal position and to return the arm to its upwardly extended position.

5. The combination of an elongated conveyor having a substantially horizontal upper run, a pair of substantially parallel tracks mounted transversely of the upper run of the conveyor in adjacent spaced relation thereto, means movable transversely of the conveyor from a predetermined side thereof in elevational spaced relation to the conveyor and returnable transversely of the conveyor along the tracks in increased proximity to the conveyor, said means being adapted to carry individual substantially horizontal drying rods having spaghetti pendantly supported thereon transversely of the conveyor whereby the spaghetti is dragged into substantially horizontal position thereacross, a wall pivotally mounted adjacent to the conveyor at the side thereof from which the rods are carried across the conveyor for movement between a substantially horizontal position extended away from the conveyor for the dragging of the spaghetti thereacross and a substantially erect position for abutting the pendant ends of the spaghetti to hold said spaghetti on the conveyor during return movement of the rods whereby the rods are separated from the spaghetti, a control arm mounted on the wall and upwardly extended therefrom into the elevated path of movement of the rods across the conveyor for engagement therewith to move the wall into substantially erect position and said arm into depressed position below the return path of movement of the rods, the wall in substantially erect position being disposed in the return path of movement of the rods for engagement therewith to move said wall into its substantially horizontal position and to return the arm to its upwardly extended position, and drive means for the conveyor having controlled connection to the wall whereby the conveyor is motivated when the wall is in horizontal position and movement thereof interrupted when the wall is moved to vertical position.

6. In an apparatus adapted to receive substantially U-shaped strands of rigid material pendantly borne by support rods and having downwardly extended ends and to segregate the material and rods for independent delivery, the combination of a pair of chains mounted for movement in corresponding circuitous paths in substantially erect parallel planes each having opposite ends and substantially horizontal upper and lower runs, an endless conveyor having an upper run located beneath an end of the chains and substantially normal to the planes thereof, means motivating the chains at substantially the same rate of speed in their respective paths and in the same direction with the upper runs caused to move toward the ends of the chains over the conveyor and the lower runs transversely of the conveyor toward the opposite ends of the chains, means for successively delivering support rods bearing the strand material to the end of the chains opposite to the conveyor, hooks borne by the chains in alignment transversely thereof adapted successively to carry rods in substantially horizontal attitude from the receiving ends of the chains along the upper runs to the ends thereof over the conveyor and return along the lower runs, a wall pivotally mounted below the chains in parallel relation to the conveyor for movement between a horizontal position extended away from the conveyor and an upwardly extended position in the path of travel of rods carried by the lower runs of the chains whereby rod engagement with the wall pivots the wall into horizontal position, means rigidly borne by the wall extended into the path of travel of rods borne by the upper runs of the chains whereby the wall is pivoted into upwardly extended position in response to movement of a rod toward the conveyor by the upper runs of the chains, and driving means for the conveyor having controlled connection to the wall motivating the conveyor when the wall is in horizontal position and interrupting conveyor motivation in response to pivotal movement of the wall into upwardly extended position.

7. In an apparatus adapted to receive substantially U-shaped strands of substantially rigid material pendently borne by support rods and having downwardly extended ends and to segregate the material and rods for independent delivery, the combination of an elongated conveyor having a substantially horizontal upper run; a pair of substantially parallel tracks mounted transversely of the upper run of the conveyor in elevationally adjacent spaced relation thereto; a pair of endless chains mounted for corresponding circuitous movement in substantially erect parallel planes aligned with the tracks each having an end over the conveyor, an opposite receiving end, and substantially horizontal upper and lower runs; means for correspondingly motivating the chains with the upper runs thereof caused to move toward the conveyor and transversely thereof and the lower runs caused to move transversely of the conveyor and away therefrom; a pair of hooks borne by the chains in alignment transversely thereof adapted to receive the support rods bearing the substantially U-shaped strands of rigid material thereon with the rods extended transversely between the chains; a wall pivotally mounted below the tracks in parallel relation to the conveyor for reciprocal movement between a horizontal position directed toward the receiving ends of the chains and an erect position extended between the lower runs of the chains; a control arm rigidly mounted on the wall in substantially right angular relation thereto for unitary pivotal movement therewith between a substantially erect position extended upwardly between the upper runs of the chains for engagement with rods carried by the hooks when the wall is in horizontal position and a substantially horizontal position over the conveyor retracted below the rods when the wall is in erect position;

and motivating means for the conveyor having controlled connection to the wall whereby the conveyor is motivated when the wall is in horizontal position and the motivation interrupted when the wall is in an erect position.

8. In an apparatus adapted to receive spaghetti pendantly looped over drying rods and to segregate the spaghetti and rods for independent delivery, the combination of a pair of chains mounted for corresponding circuitous travel in substantially erect parallel planes, said chains having substantially horizontal upper and lower runs and being driven in unitary relation with the upper runs traveled from a receiving end to a delivery end, a pair of hooks extended outwardly from the chains in alignment transversely of the chains, synchronous means for delivering rods individually to the pairs of hooks as they are traveled past the receiving ends of the chains, an arcuate track mounted about the delivery end of the chains and extended back under the lower run thereof adapted to retain the rods in proximity to the chain for travel around the delivery end and back under the lower run of the chain under hook motivation and off of the extended end of the tracks, an aligning wall mounted transversely between the chains for pivotal movement between a horizontal attitude directed toward the receiving end of the chains and an upwardly extended attitude between the chains, a control arm rigidly extended from the wall for unitary pivotal movement therewith between an upright position extended above the chains when the wall is in horizontal position for engagement by rods carried by the upper runs of the chains whereby the arm is moved downwardly into a substantially horizontal attitude extended toward the delivery ends of the chains below the rods traveled along the tracks below the lower runs of the chains with the wall in upwardly extended attitude between the chains, an endless conveyor mounted for circuitous travel beneath the track adjacent to the wall, and means for motivating the conveyor when the wall is in horizontal attitude and interrupting conveyor travel when the wall is in upright position.

9. In an apparatus adapted to receive substantially U-shaped strands of spaghetti pendantly borne by support rods and having downwardly extended ends and to segregate the spaghetti and rods for independent delivery, the combination of a pair of horizontally adjacent chains mounted for movement in corresponding circuitous paths in substantially erect parallel planes each having opposite ends and substantially horizontal upper and lower runs, an endless conveyor having an upper run located beneath corresponding ends of the chains substantially normal to the planes thereof, means motivating the chains at substantially the same rate of speed in their respective paths and in the same direction with the upper runs caused to move toward the ends of the chains over the conveyor and the lower runs transversely of the conveyor toward the opposite ends of the chains, a pair of hooks borne by the chains in alignment transversely thereof, means for successively delivering support rods bearing spaghetti to the ends of the chains opposite to the conveyor, tracks positioned adjacent to the upper runs of the chains, arcuately extended around the ends of the chains over the conveyor, and extended longitudinally beneath the lower runs of the chains, means resiliently urging the tracks toward their respective chains adapted to hold the rods in engagement with the hooks on the chains as said hooks traverse the lower runs of the chains, a wall pivotally mounted adjacent to the conveyor at the side thereof from which the rods are carried across the conveyor for movement between a substantially horizontal position extended away from the conveyor for the dragging of the spaghetti and a substantially erect position for abutting the ends of the spaghetti to hold said spaghetti on the conveyor during return movement of the rods whereby the rods are separated from the spaghetti, a control arm mounted on the wall and upwardly extended therefrom into the elevated path of movement of the rods across the conveyor for engagement therewith to move the wall into substantially erect position and said arm into depressed position below the return path of movement of the rods, the wall in substantially erect position being disposed in the return path of movement of the rods for engagement therewith to move said wall into its substantially horizontal position and to return the arm to its upwardly extended position, electrically motivated means for driving the conveyor, and an electrical energizing circuit for the conveyor driving means including a start switch mounted for engagement with the wall in horizontal position and a stop switch mounted for engagement with the wall in substantially erect position.

10. In an apparatus for handling elongated substantially U-shaped strands of material looped over supporting rods and having downwardly extended ends, the combination of a substantially horizontal strand receiving member, means for individually carrying material supporting rods in substantially horizontal attitude across the receiving member in elevationally spaced adjacent substantially parallel relation thereto to drag the material supported by the rods across the member and for individually returning the rods across the member in increased proximity to the member, a wall pivotally mounted adjacent to the strand receiving member at the side thereof from which the rods are carried across the receiving member for movement between a substantially horizontal position extended away from the conveyor for the dragging of the strands thereacross and a substantially erect position for abutting the ends of the strands to hold said strands on the receiving member during return movement of the rods whereby the rods are separated from the strands, means for moving the wall into substantially erect position in synchronism with the movement of the supporting rods across the receiving member in elevationally spaced relation to the receiving member, and means for returning the wall to its substantially horizontal position in synchronism with the movement of the rods in the return path.

ALFONSO BORRELLI.

References Cited in the file of this patent

UNITED STATES PATENTS

| Number | Name | Date |
|---|---|---|
| 1,242,542 | Gammel | Oct. 9, 1917 |
| 1,290,955 | Ford | Jan. 14, 1919 |
| 2,102,453 | Benner | Dec. 14, 1937 |

FOREIGN PATENTS

| Number | Country | Date |
|---|---|---|
| 355,501 | Great Britain | Aug. 27, 1931 |